June 26, 1956  J. L. SCHNEIDER  2,752,059
CLOSURE WITH SEALING PAD HAVING CONCENTRIC RIBS
Filed Nov. 8, 1950
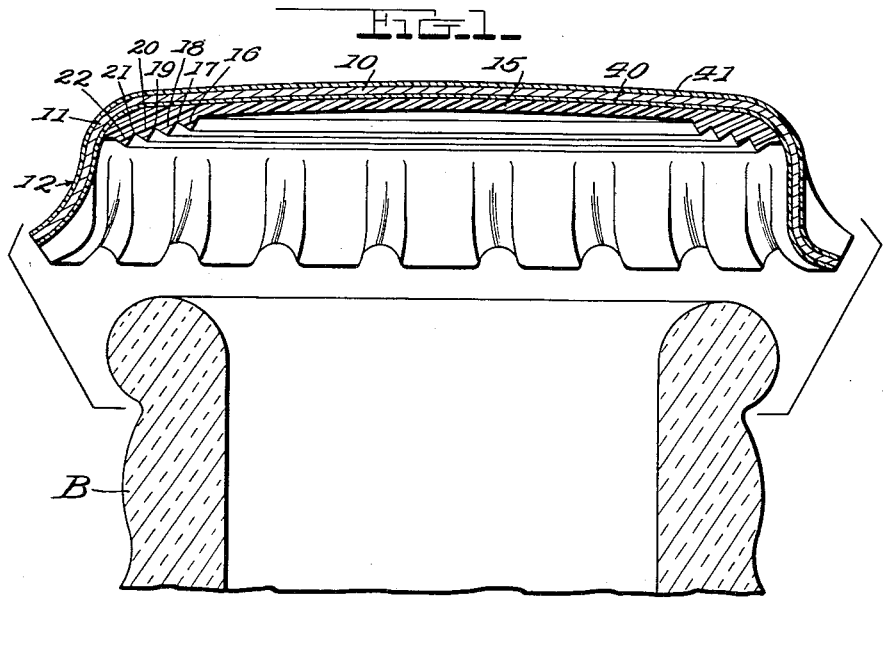
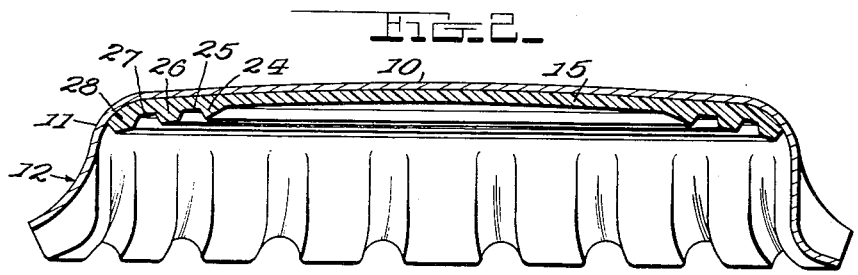
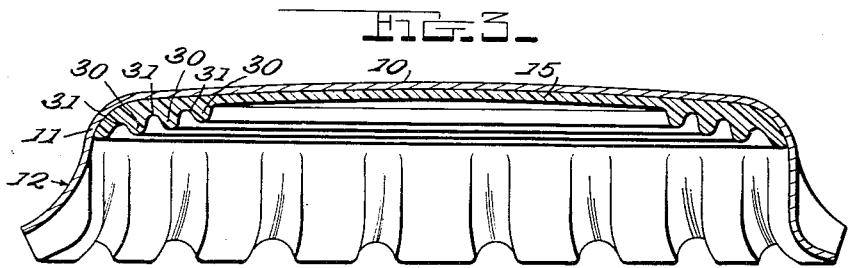
INVENTOR
Julius L. Schneider
BY Mason, Porter, Diller & Stewart,
ATTORNEYS

United States Patent Office 2,752,059
Patented June 26, 1956

2,752,059

CLOSURE WITH SEALING PAD HAVING CONCENTRIC RIBS

Julius L. Schneider, Chicago, Ill., assignor to Continental Can Company, Inc., a corporation of New York Application November 8, 1950, Serial No. 194,661

5 Claims. (Cl. 215—40)

This invention relates to closure seals or crown caps having cushion pads, and is more particularly concerned with such a pad so shaped and arranged that a secure seal can be obtained thereby, with a minimum of material.

Prior practices have been to make such pads of composition cork, rubber compounds, resin compounds, and the like, either of uniform thickness over the entire circular area of the closure shell or over the annular region which contacts the lip of the container, or with a thinner central portion opposite the bottle mouth and a thicker annular portion for engaging the container lip.

A feature of the invention is the provision of a closure seal having a cushion pad with a multiplicity of concentric ribs and grooves within the region which contacts the lip of the container on which the closure seal is used.

Another feature is the provision of a closure seal of elastomeric composition adherent to the closure shell and presenting a plurality of concentric ribs and grooves in an annular portion for engaging the lip of the container, and having a thinner central portion for covering scratches and discontinuities on the inner surface of the closure shell, for resisting damage during bulk handling of the padded closure seals and protecting the metal of the closure shell against perforations and corrosion, and for preventing deleterious action upon the contents of the container by contact with the metal of the closure shell.

A further feature is the provision of a closure seal of elastomeric resin or rubber composition adherent to the closure shell and presenting a multiplicity of concentric ribs and grooves in an annular portion for engaging the lip of the container and a thin central portion over the mouth of the container, said closure seal giving superior sealing efficiency at equal sealing pad volumes or equal sealing efficiency with reduced sealing pad volumes to sealing pads with essentially flat surfaces in the sealing area.

With these and other features in view, as will appear in the course of the following description, illustrative forms of practicing the invention are shown on the accompanying drawing, in which:

Fig. 1 is a diametrical section through a first form of construction, shown about to be applied to a bottle;

Fig. 2 is a similar view, of a second form;

Fig. 3 is a similar view, of a third form.

Crown seals are employed to close and seal containers such as bottles or cans: and bottle and can necks have been standardized in dimensions so that the crown seals of various manufacturers can be employed with bottles made by various glass manufacturers for holding aerated beverages, beer, etc. The internal gas pressure in such containers must be maintained, although the deforming stresses upon the applied and crimped caps may be high. While standardization has occurred, tolerances of dimensions, smoothness, etc., are permitted: and hence the crown seals have cushion pads of resiliently yielding material which conform to the surface and establish the seal.

It has been found that when the cushion pad is formed with a multiplicity of alternating ribs and grooves, arranged concentrically with the axis of the closure shell and hence with the container, the sealing pressure employed during crimping causes a better and more certain sealing. A high proportion of commercial bottles have irregular sealing surfaces, mold marks, or chipped surfaces so that considerable resiliency in the crown liner is required to attain satisfactory sealing, particularly in the low areas in the bottle finish. The multiplicity of alternating ribs and grooves in the cushion pad permits the liner pad to more readily yield under compression at high spots on the sealing surfaces of the bottles and similarly also to enter more readily and seal low spots in the bottle surface, thus increasing the effective resiliency and sealing efficiency of the cushion pad.

In Fig. 1, the crown shell is illustrated as of usual form, with a circular portion 10 bounded by a top corner radius 11 of smooth contour and itself leading to the corrugated skirt portion 12. Such crown shells are usually made by lacquering one surface of a metal sheet and baking; lithographing the other surface for providing advertising matter at the outer surface of the crown seal and baking; and then punching and forming the shells. Such is old in the art and forms no part of the present invention.

Such crown shells for bottle caps have the circular portion 10 internally domed with a radius of about 6 to 8 inches, this being known as the "top radius."

It is preferred to provide the inner surface of the shell with a coating of lacquer to protect the metal from atmospheric or other corrosion and to assist in preventing penetration of the contents of the container to the metal of the crown shell. Such an internal lacquer coating is illustrated by the inner lining 40 in Fig. 1. The customary external coating, bearing advertising, is also illustrated as an outer lacquer coating 41.

A cushion pad is provided adherent to the crown shell essentially throughout its area of contact therewith, as shown in Fig. 1. It has a thin central portion 15 which may have a thickness of 4 to 10 thousandths of an inch, and a diameter approximately equal to the inside diameter of the bottle mouth. Surrounding this central portion 15 are a multiplicity of ribs 16, 18, 20, 22 separated by grooves 17, 19, 21. Four such ribs are shown in Fig. 1, each being of triangular section with a crest angle of about 90°, and spaced about 60 thousandths of an inch apart. In the form shown in Fig. 1, the tops of the ribs lie in a conical surface approximately parallel to the top curvature of the crown shell so that each rib extends approximately an equal distance from the inner surface of the crown shell; which will be about 0.033 inch when 200 cu. mm. of cushion material are used.

The ribs and grooves need not have identical shapes or sizes. Thus, in the form shown in Fig. 2, the central portion 15 of the pad is surrounded by three concentric ribs 24, 26, 28 alternating with the grooves 25 and 27. In this arrangement, the inner rib 24 is of triangular section, the inner flank being at an angle of about 30° and the outer flank at an angle of about 70°, each relative to the plane of the crown shell portion 10. The grooves and outer ribs have truncated or trapezoidal cross sections, each with a trough or crest about 20 thousandths of an inch wide, and with the flanks of the grooves at angles of about 70°. The outer flank of the outer rib 28 has an angle of about 45° and terminates at the region of the top corner radius of the crown shell. In this form, the tops of the ribs are illustrated as being in a plane parallel to the central portion 15.

In the form shown in Fig. 3, the ribs 30 and grooves 31 are shown as having curved contours or flanks.

Each of these crown seals can be applied to the container in the usual way, such as the bottle B indicated in Fig. 1. The cap is placed over the mouth, and then forced downward until the cushion material engages the outer end surface of the bottle lip and is deformed elastically to fit the same, wherewith the ribs are flattened and spread into the adjacent groove spaces at the high spots of the end surface, therewith requiring lesser total sealing pressures than the seals made with the cushion of uniform thickness. The skirt of the crown shell is then forced inward by the usual crimping operation to engage the locking ring or bead on the container and thus to hold the cap in its applied position and with the cushion material under maintained sealing pressure.

It is presently preferred to have the relative cross-sectional shape and size of the ribs and grooves such that the volume of material in the ribs is not less than the volume of the space provided by the grooves: and it is preferred to have the bottoms of the grooves spaced a distance from the inner surface of the crown shell which is not less than the thickness of the thin central portion 15 when this is present. For example, in Fig. 2, the exposure surfaces of the central portion 15 and the bottoms of grooves 25, 27 are at equal distances from the shell.

Since each rib initially acts independently of the others, and exerts its elastic sealing effect independently, the total thickness in the sealing region can be the same as with prior seals, wherewith there is saved the volume of material represented by the grooves.

Such cushion pads may be made by forming and shaping the same in place in the crown shell in which they are later to be employed: or they may be made by a separate operation and then individually placed in and caused to adhere in their respective crown shells.

When formed in place, a standard quantity, e. g. 175 to 200 cu. mm., of a suitable thermoplastic material may be placed in the crown shell and subjected to the action of a heated punch for giving the exposed surface the desired shape, for example by the procedure described and claimed in my copending application Serial No. 194,662, filed November 8, 1950.

The material employed for the purpose may be of any suitable thermoplastic elastomer type, competent to resist the contents of the container to be sealed, such as natural or synthetic rubber compound, synthetic resin materials, and the like.

For example, "paste resins" can be employed, in which the basic ingredients are an elastomer and a plasticizer therefor, the plasticizer being so selected that the elastomer is not actively soluble, i. e. essentially insoluble, therein at room temperature, but is soluble at some elevated fluxing temperature. These two ingredients are ground together to form a paste which is flowable at, say, 110 to 115° F., and the paste may also include other components such as inert fillers to limit cutting, modifying resin to assist control of the physical properties, stabilizers for the resin and other components, waxes to prevent blocking and to reduce moisture vapor and gas permeability, etc. However, these other materials are not essential in the composition, but may be employed to contribute to the desired properties for the particular employment. In general, the formulations described in the Foye United States Patent No. 2,489,407 and in South African Patent No. 2556/47 may be employed, noting that the filler and other components may be omitted if so desired. The elastomer component may be a vinyl resin of the class inclusive of polyvinyl chloride, copolymers of vinyl chloride and vinyl acetate such as the 97:3 per cent copolymer, vinylidene chloride polymers, and copolymers of vinyl chloride and vinylidene chloride. The chloride content should be high, when the seal is to resist aqueous liquids; such as 90 per cent vinyl chloride in a copolymer.

Among the plasticizers useful are those which have a very slow wetting or dissolving action upon the selected vinyl resin at room temperature and at temperatures up to around 115° F. The ester type plasticizers of vinyl resins have this general characteristic, and require higher temperatures for producing penetration, diffusion, and intersolution. A preferred plasticizer is dioctyl phthalate: others are dibutyl phthalate, dioctyl sebacate, and tricresyl phosphate. The plasticizer should be liquid at the temperature of use.

The ratio of the elastomer and plasticizer, by weight, may be from 6:4 to 4:6, with preference for a ratio of about 1:1.

Standard quantities of such paste resins may be deposited in successive crown shells, and these in turn brought onto a hot platen and engaged by the hot punch. This engagement may occur while the deposited mass is essentially in its original condition, or the loaded shells may previously be moved through an oven, for example, so that a preliminary or partial curing is accomplished before the shaping is effected. The pressure required for shaping the mass depends upon the composition employed and the degree of curing which has been effected prior to the engagement, and upon the temperature of the mass during the shaping operation. In practice it has been found that paste resins in original condition require less than 30 to 50 pounds per square inch pressure for the shaping operation itself, wherewith a total pressure of 100 pounds is effective with the standard size of crown seal for producing the shaping of the mass and also the aforesaid resilient flattening of the domed bottom. Correspondingly, with partially or completely cured paste resin masses, shaping has been accomplished in standard crown shells with pressures of 150 pounds or less.

When a rubbery or other non-fluid composition is employed for the pad, the charge may be introduced into the crown shell in the form of a disk or partly shaped blank, the completion of the shaping and the adhesion being accomplished by the use of a hot platen and a hot punch, illustratively as set out in my aforesaid copending application. A suitable rubbery composition has rubber as an elastomer base which can be modified as desired by fillers, lubricant, and vulcanization agents. An illustrative formulation is:

| | Parts by weight |
|---|---|
| Crepe rubber (natural latex rubber) | 88 |
| Semi-solid isobutylene polymer | 12 |
| Hydrated precipitated calcium silicate | 63 |
| Clay | 65 |
| Zinc oxide | 5 |
| Stearic acid | 2 |
| Heptylated diphenylamine | 1 |
| Dipentamethylene thiuram tetrasulfide | 1 |
| Tetramethyl thiuram monosulfide | 1½ |
| | 238.5 |

It is preferred to have the inner surface of the crown shells lacquered during manufacture. For example, a vinyl lacquer prepared as described in the Maier et al. Patent No. 2,380,456, with 80 per cent of vinyl chloride-vinyl acetate copolymer resin and 20 per cent of oleoresinous modifier produces a satisfactory adhesion. When the crown seals are to be employed with carbonated beverages, beer, fruit juices, vinegar, etc., it is preferred to employ a trimer lacquer having a corresponding solids formulation of 80 per cent of vinyl chloride-vinyl acetate copolymerized in the presence of maleic anhydride as a modifier, for example in the respective ratios of 85:13:2, together with 20 per cent of a phenolic resin derived from ortho-cresol. Either of these lacquers can be prepared in an organic solvent, such as 70% xylol and 30% isophorone, with 20% solids, for roller coating. For spraying, more volatile solvents, such as toluol, methyl ethyl ketone, and methyl isobutyl ketone, can be used. After applying and drying, the coating is baked.

Such cushion pads may also be formed separately from the crown shells; and then inserted and caused to adhere as by a cement, in fashions understood by those skilled in the art.

It is obvious that the illustrative forms of practice are not restrictive, and that the invention may be practiced in many ways within the scope of the appended claims.

I claim:

1. A crown cap adapted for pressure containers having a closure shell and a cushion pad of resiliently elastic material, the closure shell having an internally domed circular portion with a smooth internal surface bounded by a top corner radius portion of smooth curvature and having a peripheral skirt portion joined to said top corner radius portion and adapted for engagement with the locking ring of the container, characterized in that the cushion pad has a smooth back adherent to the shell and extending over said internal surface and onto said top corner radius portion and terminating at said top corner radius portion whereby said skirt portion can be engaged directly with the container, said pad having a thin central portion for location over the container mouth and having at the annular region for contact with the top sealing surface of the container lip a multiplicity of concentric ribs alternating with grooves; the lip-contacting portion of each rib, before application to the container lip, projecting farther from the closure shell than the thickness of the thin central portion and the grooves providing spaces into which the material of the adjacent ribs can be elastically spread when flattened during application to the container and as held by engagement of the skirt with the locking ring.

2. A closure seal as in claim 1, in which the ribs are of triangular section.

3. A closure seal as in claim 1, in which the volume of material in the ribs is not less than the volume of the space provided by the grooves.

4. A closure seal as in claim 1, in which the outermost groove has its bottom at a greater distance from the shell surface than the innermost groove.

5. A closure seal as in claim 1, in which there are at least three such concentric ribs alternating with grooves of substantially uniform depth, at least one groove being formed by rib walls whose flanks in cross section are essentially constituted by straight lines at acute angles to the said internal surface.

References Cited in the file of this patent

UNITED STATES PATENTS

| | | |
|---|---|---|
| 785,116 | Perry | Mar. 21, 1905 |
| 1,032,836 | Jess | July 16, 1912 |
| 1,995,350 | Hoag | Mar. 26, 1935 |
| 2,117,807 | Jesser | May 17, 1938 |
| 2,327,454 | Punte | Aug. 24, 1943 |
| 2,327,455 | Punte | Aug. 24, 1943 |
| 2,489,407 | Foye | Nov. 29, 1949 |
| 2,492,144 | Gora | Dec. 27, 1949 |
| 2,543,775 | Gora | Mar. 6, 1951 |

FOREIGN PATENTS

| | | |
|---|---|---|
| 969,87 | France | May 31, 1950 |